United States Patent [19]

Yamamoto

[11] Patent Number: 4,937,208
[45] Date of Patent: Jun. 26, 1990

[54] CATALYST FOR SOL-GEL METHOD USING METAL ALKOXIDE AND SOL-GEL METHOD USING THE SAME

[76] Inventor: Tohru Yamamoto, c/o Nakato Laboratory, Inc., 6, Ohshinohara, Yasu-cho, Yasu-gun, Shiga-ken, Japan

[21] Appl. No.: 158,387

[22] Filed: Feb. 22, 1988

[51] Int. Cl.$^5$ ................................................ C03C 1/00
[52] U.S. Cl. ........................................ 501/12; 65/901
[58] Field of Search ............................ 501/12; 65/901; 502/167

[56] References Cited

U.S. PATENT DOCUMENTS

| | | | |
|---|---|---|---|
| 4,278,632 | 7/1981 | Yoldas | 501/12 |
| 4,681,615 | 7/1987 | Toki et al. | 501/12 |

FOREIGN PATENT DOCUMENTS

| | | | |
|---|---|---|---|
| 184255 | 6/1986 | European Pat. Off. | |
| 57-7814 | 1/1982 | Japan | |
| 59-116135 | 7/1984 | Japan | |
| 60-27611 | 2/1985 | Japan | |
| 60-215532 | 10/1985 | Japan | |
| 62-230602 | 10/1987 | Japan | 501/12 |
| 62-265129 | 11/1987 | Japan | 501/12 |

OTHER PUBLICATIONS

Chemical Abstracts, vol. 108, No. 12, 21st Mar. 1988, p. 349, No. 99925p, Columbus, Ohio, U.S.; & JP-A-62 265 129 (Hitachi Chemical Co., Ltd.), 18-11-1987, *Abstract*.

Journal of the American Ceramic Society, vol. 69, No. 4, Apr. 1986, pp. C-72–C-74, Columbus, Ohio, U.S.; A. Makishima et al.: "Preparation of Amorphous Silicas Doped with Organic Molecules by the Sol-Gel Process", *pp. C-72, C-73*.

Journal of Non-Crystalline Solids, vol. 100, Mar. 1988, pp. 31–49, Elsevier Science Publishers B.V., North-Holland, Amsterdam, NL; C. J. Brinker: "Hydrolysis and Condensation of Silicates: Effects on Structure", *p. 33*.

*Primary Examiner*—Mark L. Bell
*Assistant Examiner*—Anthony J. Green
*Attorney, Agent, or Firm*—Irell & Manella

[57] ABSTRACT

A catalyst for sol-gel methods using metal alkoxide comprises a mineral acid or its anhydride and an organic base, said organic base being a tertiary amine that is substantially insoluble in water and soluble in organic solvents. A sol-gel method using the above-mentioned catalyst comprises a step of hydrolyzing a metal alkoxide with a subsequent polycondensation of hydrolyzate thereof using the catalyst, resulting in a polymer containing gel.

3 Claims, No Drawings

CATALYST FOR SOL-GEL METHOD USING METAL ALKOXIDE AND SOL-GEL METHOD USING THE SAME

BACKGROUND OF THE INVENTION

1. FIELD OF THE INVENTION

This invention relates to a catalyst for sol-gel methods using metal alkoxide that can form a gel at ordinary temperatures and under neutral conditions in a short period of time, the gel forming no cracks when dried. The invention also relates to a sol-gel method that makes use of this catalyst.

2. DESCRIPTION OF THE PRIOR ART

In recent years, synthetic methods for glass make use of metal alkoxides (sol-gel methods) have received attention. In these methods, along with the hydrolysis of the metal alkoxides, polycondensation proceeds so as to produce molecules of high molecular weight. In the sol-gel method, the metal alkoxides are dissolved in alcohol, and a fixed amount of water is added, together with catalysts such as mineral acids, organic acids, inorganic bases (or example, NaOH or KOH), ammonia, and so on; and the procedure is done at a temperature in the range of ordinary temperatures to 80°C. The hydrolysis of metal alkoxides and the polycondensation reaction take place at the same time. In this method, because the glass is obtained at relatively low temperatures, it is possible to reduce costs. The method can also be used for the production of composite materials comprising metals, plastics, etc.

At first, in this sol-gel method, only one catalyst such as a mineral acid, inorganic base, ammonia, etc., is used. In a system like this in which only one catalyst is used, a long period of time, from 24 to 700 hours, is needed for gelation. Moreover, during the process of gelation, because the alcohol and water used as solvents vaporize, the hydrolyzed alkoxide brings about a non-uniform degree of polymerization, resulting in a wet gel in which there are differences in the degree of polymerization in places, which causes the formation of cracks easily in the dry gel (glass) that is obtained from the said wet gel.

A number of trials to manufacture glass of superior quality in a short period of time by the solgel method have been made. For example, Japanese Pat. Publication No. 60-27611 discloses a method for the manufacture of gels in which an acid is added to an aqueous solution of silica alkoxides so as to hydrolyze the said silica alkoxides, thereby completing the hydrolysis. Thereafter, a base is added to the reaction mixture in order to bring the pH to 5–6, resulting in a gel. In Japanese Pat. Publication No. 60-215532, a method is disclosed for the production of a gel in which acid and alkali are used to hydrolyze a metal alkoxide in separate preparations, after which the hydrolyzed preparations are mixed to make a gel. In Japanese Pat. Publication No. 57-7814, a method is disclosed in which a metal alkoxide is dissolved in a small volume of a mixture of water and alcohol, an acid is added as a catalyst to the solution, and the reaction mixture is refluxed, during which process more of the water-alcohol mixture is added, and after which a base is added to cause gelation. When these methods are used, the process of gelation is completed in a relatively short period of time (several dozens of minutes to several hours). However, the wet gel obtained is not necessarily uniform, and when the wet gel is dried to obtain a dry gel, it readily cracks. On the other hand, a method is disclosed in Japanese Pat. Publication No. 59-1161635 in which first a sol of very fine particles is made by hydrolysis of part of a solution of metal alkoxides, and this sol is added to the remaining solution of the metal alkoxides. The mixture obtained is made into a preparation of a gel containing a polycondensation product that is produced by ordinary hydrolysis and polycondensation processes. By this method, the formation of cracks is reduced, but it is not possible to obtain a gel, the uniformity of which is virtually uniform.

SUMMARY OF THE INVENTION

A catalyst for sol-gel methods using metal alkoxides of this invention, which overcomes the above-discussed and numerous other disadvantages and deficiencies of the prior art, comprises a mineral acid or its anhydride and an organic base, said organic base being a tertiary amine that is substantially insoluble in water and soluble in organic solvents.

In a preferred embodiment, the tertiary amine is at least one selected from the group consisting of N,N-dimethylbenzylamine, tributylamine, tri-n-propylamine, tripentylamine, tripropargylamine, N,N,N-trimethylethylenediamine, and tri-n-hexylamine.

In a preferred embodiment, the metal alkoxides are at least one selected from the group consisting of Si(OC$_2$H$_5$)$_4$, Al(O-iso-C$_3$H$_7$)$_3$, Ti(O-iso-C$_3$H$_7$)$_4$, Zr(O-t-C$_4$H$_9$)$_4$, Zr(O-n-C$_4$H$_9$)$_4$, Ca(O-C$_2$H$_5$)$_2$, Fe(OC$_2$H$_5$)$_3$, V(O-iso-C$_3$H$_7$)$_4$, Sn(O-t-C$_4$H$_9$)$_4$, Li(OC$_2$H$_5$), Be(O-C$_2$H$_5$)$_2$, B(OC$_2$H$_5$)$_3$, P(OC$_2$H$_5$)$_3$, and P(OCH$_3$)$_3$.

A sol-gel method of this invention comprises a step of hydrolyzing a metal alkoxide with a subsequent polycondensation of the hydrolyzate thereof using a catalyst, resulting in a polymer-containing gel, said catalyst being a mineral acid or its anhydride and an organic base, and said organic base being a tertiary amine that is substantially insoluble in water and soluble in organic solvents.

The tertiary amine and the metal alkoxide used for the sol-gel method of this invention are at least one selected from each of the above-listed groups.

Thus, the invention described herein makes possible the objectives of (1) providing a catalyst for sol-gel methods with which it is possible to produce a wet homogeneous gel with the desired quality in a short period of time, the said gel when dried giving rise to no cracking; (2) providing a sol-gel method using metal alkoxides in which the above-mentioned catalyst is used to markedly shorten the time needed for gelation, and with which, moreover, by changing of the amount of the said catalyst, it is easy to change the rate of gelation within the range of several seconds to several dozens of minutes; and (3) providing a sol-gel method using metal alkoxides by which it is possible to prepare the above-mentioned high-quality wet gel easily by the use of the above-mentioned catalyst.

DESCRIPTION OF THE PREFERRED EMBODIMENT

The inventors of this invention have, in the sol-gel method using metal alkoxides, found it preferable to employ a specific tertiary amide as catalyst in addition to a well-known conventional acid catalyst (mineral acid or its anhydride), by which it is possible to shorten the time needed for gelation markedly, and by which the time needed for gelation can be adjusted as desired.

Also, by the use of this kind of catalyst, a uniform wet gel can be obtained, and so when the wet gel is dried, cracking does not occur. With these discoveries, the inventors of this invention have completed this invention.

As the metal alkoxide used in this invention, there are, for example, $Si(OC_2H_5)_4$, $Al(O\text{-}iso\text{-}C_3H_7)_3$, $Ti(O\text{-}iso\text{-}C_3H_7)_4$, $Zr(O\text{-}t\text{-}C_4H_9)_4$, $Zr(O\text{-}n\text{-}C_4H_9)_4$, $Ca(O\text{-}C_2H_5)_2$, $Fe(OC_2H_5)_3$, $V(O\text{-}iso\text{-}C_3H_7)_4$, $Sn(O\text{-}t\text{-}C_4H_9)_4$, $Li(OC_2H_5)$, $Be(O\text{-}C_2H_5)_2$, $B(OC_2H_5)_3$, $P(OC_2H_5)_3$, and $P(OCH_3)_3$.

As the mineral acid used as a catalyst, it is possible to use hydrochloric acid, sulfuric acid, nitric acid, etc. It is possible to obtain the same effects with the use of the anhydride of mineral acids, for example, with hydrogen chloride gas. Also, organic acids and their anhydrides can be used. For example, tartaric acid, phthalic anhydride, maleic anhydride, dodecylsuccinic anhydride, hexahydrophthalic anhydride, methyl endic anhydride, pyromellitic dianhydride, benzophenonetetracarboxylic anhydride, dichlorosuccinic anhydride, and chlorendic anhydride can be used. Per mole of the metal alkoxide, 0.01 mol or more of these acids, and preferably 0.01–0.5 mol, can be used. If the amount of the acid is less than 0.01 mol, the hydrolysis of the metal alkoxides does not proceed substantially.

Bases used as a catalyst are organic bases that are substantially insoluble in water and soluble in organic solvents. As such tertiary amines, N,N-dimethylbenzylamine, tributylamine, tri-n-propylamine, tripentylamine, tripropargylamine, N,N,N-trimethylethylenediamine, tri-n-hexylamine, etc., can be used. The tertiary amine can be used at equimolar amounts or in excess amounts of the acid mentioned above; preferably, it is used in amounts ranging from 0.01 to 0.06 mol per mole of the metal alkoxide. The amount of tertiary amine to be used can be chosen within the limits mentioned above with consideration of its degree of dissociation. If there is too little tertiary amine, then after the hydrolysis of the metal alkoxide, the rate of polycondensation is greatly slowed.

As the solvent that can be used in the sol-gel method, in addition to the water used in the hydrolysis, it is possible to use an organic solvent. As the organic solvent, solvents that are miscible with water or solvents that can be partly dissolved in water can be used. These include, for example, methanol, ethanol, butanol, n-propanol, isopropanol, pentanol, hexanol, acetone, methyl ethyl ketone, and formamide. It is also possible to use additives when the sol-gel method is carried out. As additives, there are silver halide, barium titanate, transition elements, chalcogens, etc. If various monomers, polymers, Bisphenol A, epichlorohydrin, and/or coupling agents are added, it is possible to make a composite material in which organic and inorganic compounds are bound on the molecular level. If essences, perfumes, pigments, or dyes are added, it is possible to manufacture scented gels or colored gels.

With the use of this catalyst, the sol-gel method using metal alkoxides is carried out, for example, as follows:

First, the metal alkoxide is dissolved in organic solvents mentioned above, such as alcohol. To this, a fixed amount of water and a fixed amount of mineral acid (one of the two forms of the catalyst; or else its anhydride) catalyst for the sol-gel method mentioned above are added, and the mixture is kept at a temperature in the range of ordinary temperatures to 80°C. With this treatment, hydrolysis is virtually complete. Into this reaction mixture, the tertiary amine catalyst (the other of the two forms of the catalyst) is added. When the tertiary amine is added, a polycondensation reaction proceeds and gelation is completed within a relatively short time. The time of the gelation depends on the amount of water used and the amount of catalyst for the sol-gel method that is used. In general, it is possible to control the time of gelation from about 2 seconds to several dozens of minutes. The said gelation time is measured from the time when the addition of the tertiary amine causes neutralization of the mineral acid, which brings the pH of the reaction mixture to 7.

By the method of this invention, a small amount of the catalyst for the sol-gel method is sufficient. Thus, it is possible to keep the reaction system at an approximately neutral pH.

With the use of the catalyst for the sol-gel method of this invention, the hydrolysis of the alkyl silicate and the polycondensation of the hydrolysis product obtained are assumed to proceed as follows:

First, the mineral acid catalyzes the hydrolysis of the alkyl silicate.

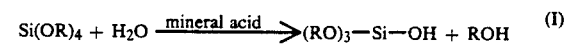

With the addition of the tertiary amine, the following reaction takes place.

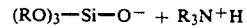

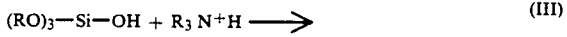

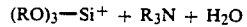

The $(RO)_3\text{-}Si\text{-}O^-$ and $(RO)_3\text{-}Si^+$ that are produced in reaction Formulae II and III are polycondensed, and form an inorganic compound of high molecular weight represented by structural Formula IV or its analogs:

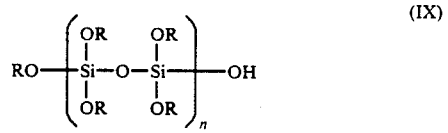

It is well known that per mole of metal alkoxide, 1 mole of water is needed for the production of linear polymer compounds theoretically, whereas more than 1 mole of water is needed for starting the production of crosslinked polymer, theoretically.

From the recent experimental results that have obtained by the inventors, it seems that the hydrolysis of the metal alkoxide in the reaction shown in Formula I is an $SN_2$ reaction. To have the reaction proceed toward the right, it is effective to remove the alcohol (ROH) that is produced during the reaction from the reaction system, so as to lower its concentration; also, it is effective to remove the hydroxyl groups or hydrogens from $(RO)_3\text{-}Si\text{-}OH$, so as to allow the polycondensation reaction to proceed advantageously. In the process of the invention, the tertiary amine reacts with $(RO)_3\text{-}Si\text{-}OH$ that is produced in Formula I to form the $(RO)_3\text{-}Si\text{-}O^-$ and the $(RO)3\text{-}Si^+$ shown in Formulae II and III, and these rapidly give rise to the polycondensed compound of Formula IV via a chain reaction.

It is possible to use other inorganic bases or other amines in place of the tertiary amine to allow the reaction to proceed in the same way. However, almost all other bases are soluble in water. If such bases that are soluble in water are added to the reaction mixture mentioned above, the mineral acid that is positioned in the vicinity of the added base is neutralized rapidly. Therefore, a polycondensation reaction in the vicinity of where the base is dropped into or injected into the system proceeds rapidly, resulting in a highly cross-linked polymer. Thus, the gel that is obtained will not be uniform. In particular, if the base that is soluble in water as mentioned above is dissolved in water and added, this tendency is strong, and the gel will be whitened in places, or the particles of gel with high density that are whitened will be unevenly dispersed throughout the whole gel. When this kind of gel is dried, it readily forms cracks.

For this reason, the base that is used in this invention is a tertiary amine that is substantially insoluble in water. This tertiary amine is dispersed uniformly throughout the reaction mixture, and is partly dissolved. The dissolved base neutralizes the mineral acid, after which it reacts with the hydroxides formed by hydrolysis of metal alkoxides, resulting in a polycondensed compound of high molecular weight. This reaction is extremely rapid. The gel obtained throughout the entire reaction using a tertiary amine that is insoluble in water is uniform. On the contrary, a gel obtained by the use of bases that are soluble in water is not uniform. This is because the above polycondensation reaction occurs after the base is dispersed uniformly throughout the reaction mixture. Of the tertiary amines used in this invention, N,N-dimethylbenzylamine gives a particularly uniform gel, which makes possible the production of a glass (dry gel) of high quality.

EXAMPLE 1

In 22 ml of ethanol, 26 g of ethyl silicate $(Si(OC_2H_5)_4)$ was dissolved. Per mole of said ethyl silicate in this reaction mixture, 0.03 mol of HCl and 16 mol of water were added, and the whole was mixed so that hydrolysis took place. Five seconds after the addition of the HCl and water mentioned above, 0.06 mole of N,N-dimethylbenzylamine in 3 ml of ethanol was added at once into the mixture while the mixture was being stirred. Gelation occurred in 3 seconds after the N,N-dimethylbenzylamine was added, and a colorless, transparent, homogeneous gel was obtained. This wet gel soon began to harden at the surface, and after 5 minutes therefrom, gelation was completed. Then, formamide was added to the wet gel, and the mixture was left for one hour to allow replacement of the ethanol in the gel with formamide and to allow the ethanol to vaporize gradually. Further, ethanol was removed by heating of the gel at 60°C. in a thermostat. The temperature of the thermostat was gradually raised to 150°C., at which the gel was kept for 6 hours, giving a transparent dry gel. This was then heat-treated under an $N_2$ atmosphere at 800–1050°C., and silica glass without cracks and with the specific gravity of about 2.1 was obtained.

EXAMPLE 2

The conditions were the same as in Example 1 except for the use of 10 mol of water. Gelation began 5 seconds after N,N-dimethylbenzylamine was added. Silica glass with the same quality as that in Example 1 was obtained.

EXAMPLE 3

The conditions were the same as in Example 1 except for the use of 8 mol of water. Gelation began 10 seconds after N,N-dimethylbenzylamine was added. Silica glass with the same quality as that in Example 1 was obtained.

EXAMPLE 4

In 22 ml of ethanol, 26 g of ethyl silicate $(Si(OC_2H_5)_4)$ was dissolved. Per mole of the ethyl silicate in this solution, 0.03 mol of HCl and 1 mol of water were added and mixed. Five seconds later, 0.06 mol of N,N-dimethylbenzylamine dissolved in 3 ml of ethanol was added at once to the mixture while it was being stirred. While this mixture was being stirred, heat treatment was done at 60°C. for 1 to 1.5 hours which a viscous solution was obtained. The viscosity of the solution was 10–15 poise. To this, 5 ml of a 50:50 (v/v) mixture of ethanol and formamide was added to bring the viscosity to 10–50 poise. Then a viscous thread was pulled out of this mixture by the use of a glass rod. This was dried in the air, which gave a continuous fiber with flexibility. This was baked under a nitrogen atmosphere at 800–1050°C, which gave a silica-glass fiber of high purity.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A sol-gel method comprising a step of hydrolyzing a metal alkoxide with a subsequent polycondensation of hydrolyzate thereof using an acid catalyst and a base catalyst, resulting in a homogeneous polymer-containing gel, said acid catalyst being at least one selected from the group consisting of hydrochloric acid, hydrogen chloride gas, sulfuric acid, anhydride of sulfuric acid, nitric acid, anhydride of nitric acid, tartaric acid, phthalic anhydride, maleic anhydride, dodecylsuccinic anhydride, hexahydrophthalic anhydride, methyl endic anhydride, pyromellitic dianhydride, benzophenonetetracarboxylic anhydride, dichlorosuccinic anhydride, and chlorendic anhydride, and said base catalyst being a tertiary amine that is substantially insoluble in water and soluble in organic solvents.

2. A sol-gel method according to claim 1, wherein said tertiary amine is at least one selected from the group consisting of N,N-dimethylbenzylamine, tributylamine, tri-n-propylamine, tripentylamine, tripropargylamine, N,N,N-trimethylethylenediamine, and tri-n-hexylamine.

3. A sol-gel method according to claim 1, wherein said metal alkoxide is at least one selected from the group consisting of $Si(OC_2H_5)_4$, $Al(O\text{-iso-}C_3H_7)_3$, $Ti(O\text{-iso-}C_3H_7)_4$, $Zr(O\text{-t-}C_4H_9)_4$, $Zr(O\text{-n-}C_4H_9)_4$, $Ca(OC_2H_5)_2$, $Fe(OC_2H_5)_3$, $V(O\text{-iso-}C_3H_7)_4$, $Sn(O\text{-t-}C_4H_9)_4$, $Li(OC_2H_5)$, $Be(O\text{-}C_2H_5)_2$, $B(OC_2H_5)_3$, $P(OC_2H_5)_3$, and $P(OCH_3)_3$.

* * * * *